United States Patent [19]

Turner et al.

[11] 4,333,664
[45] Jun. 8, 1982

[54] RECUMBENT VEHICLE

[76] Inventors: Milton Turner, 691 S. Irolo St., Los Angeles, Calif. 90005; Julian M. Smith, 1607 E. 126th St., Compton, Calif. 90222

[21] Appl. No.: 124,441

[22] Filed: Feb. 25, 1980

[51] Int. Cl.³ ............................................. B62K 3/14
[52] U.S. Cl. ............................ 280/261; 280/281 LP; 280/288; 280/279
[58] Field of Search ............. 280/281 R, 281 LP, 288, 280/261

[56] References Cited

U.S. PATENT DOCUMENTS

| | | | |
|---|---|---|---|
| 846,033 | 3/1907 | Kidney | 280/281 LP |
| 2,482,472 | 9/1949 | Fried | 280/261 |
| 4,198,072 | 4/1980 | Hopkins | 280/281 LP |

FOREIGN PATENT DOCUMENTS

| | | | |
|---|---|---|---|
| 76228 | 12/1947 | Czechoslovakia | 280/261 |
| 832340 | 9/1938 | France | 280/281 LP |
| 850061 | 12/1939 | France | 280/261 |
| 869277 | 1/1942 | France | 280/281 R |
| 7404229 | 9/1975 | Netherlands | 280/281 LP |
| 453687 | 9/1936 | United Kingdom | 280/281 LP |
| 496086 | 11/1938 | United Kingdom | 280/261 |
| 784223 | 10/1957 | United Kingdom | 280/288 |

Primary Examiner—John P. Silverstrim
Attorney, Agent, or Firm—Romney, Golant, Martin, Disner & Ashen

[57] ABSTRACT

A bicycle operated by a rider in a reclining position. The frame of the bicycle is constructed of a forward section, a middle section and a rear section. The rear section supports the rear wheel and the back of the seat. An X member behind the seat connected to the rear section provides further support for the back of the seat. The forward section is reinforced by a pair of more or less parallel crank assembly braces extending from the rear of the middle section to a crank assembly positioned at the front of the forward section. A chain extends from the crank assembly to the rear wheel to drive the bicycle.

22 Claims, 2 Drawing Figures

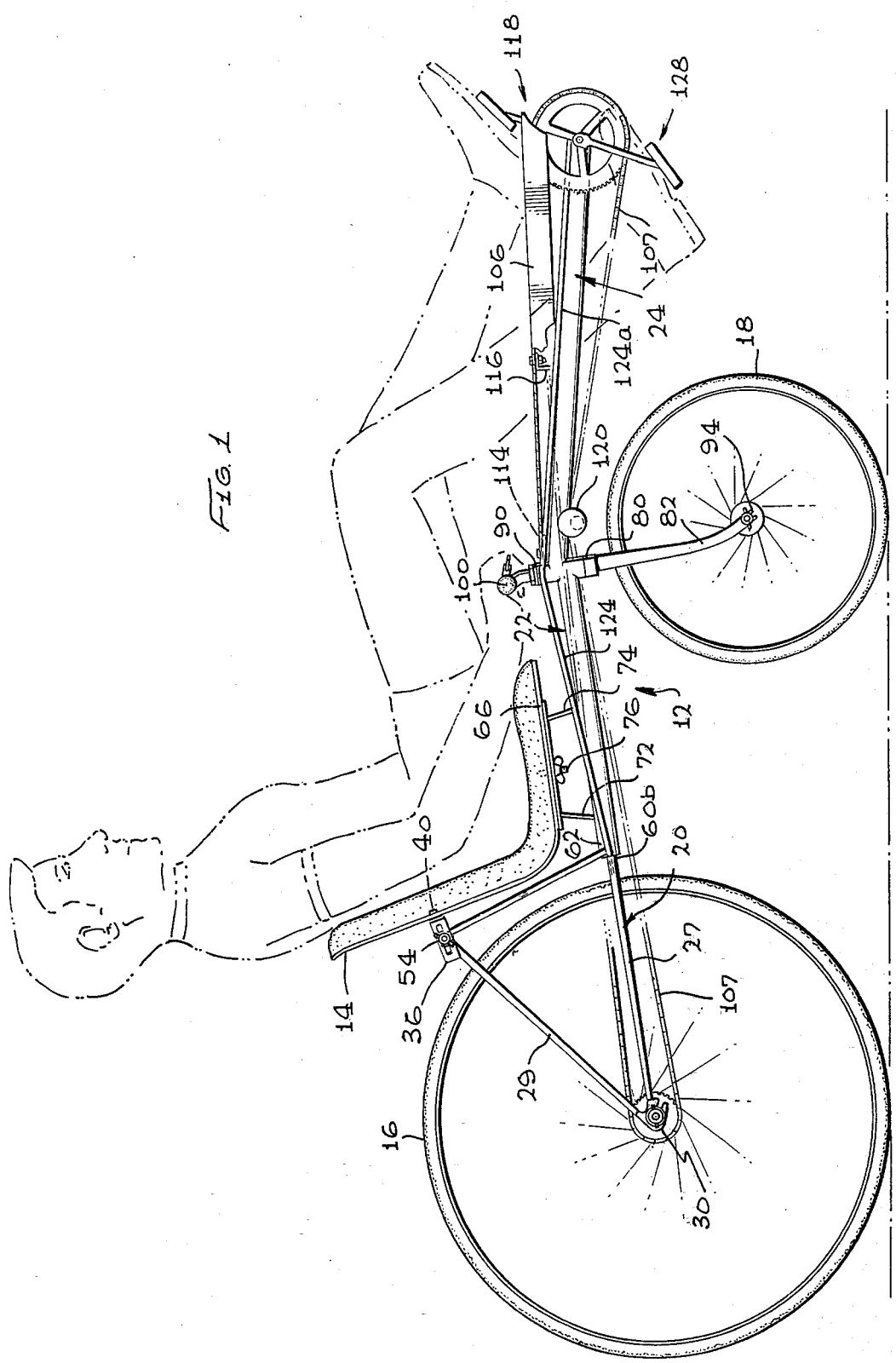

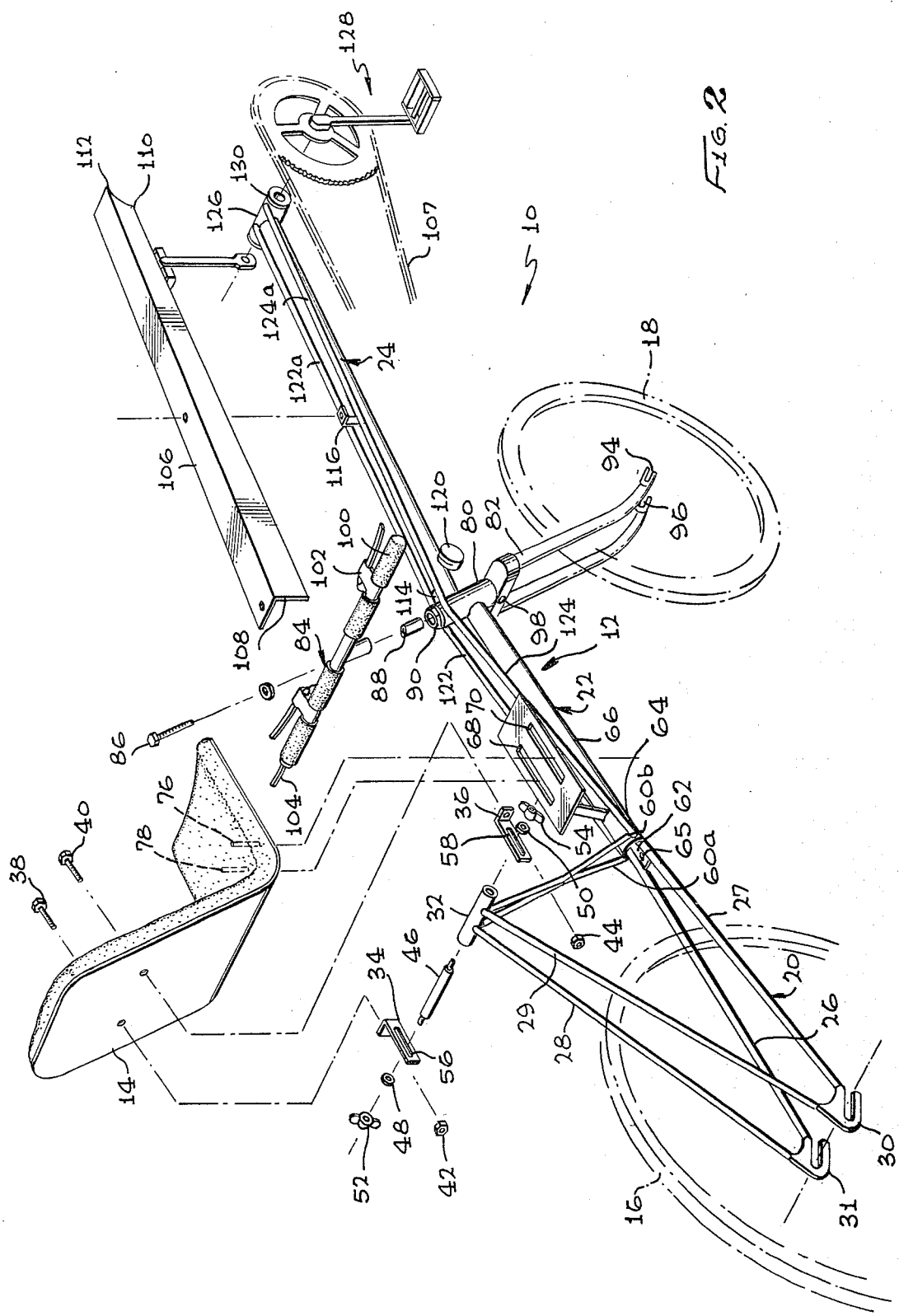

RECUMBENT VEHICLE

BACKGROUND OF THE INVENTION

1. Field

This invention relates to two wheeled manually powered land vehicles and, in particular, to an improved recumbent two-wheeled pedalable land vehicle bicycle.

2. Prior Art

Bicycles have been known for quite some time. They generally consist of two wheels, a frame, a seat, and pedal cranks connected to the rear wheel via a chain. The rider rotates the pedal cranks with his feet to rotate the rear wheel and drive the bicycle. These devices are very good for some transportation needs, they provide good exercise, sport, and, in general, are fun to use. The position of the rider, however, presents more than one difficulty with the conventional bicycle. The rider sits on top of the frame with his legs hanging down. In order to get any appreciable force into his leg stroke, the rider must stand and pull up on the handle bars while pushing down with his feet. The amount of pressure that can be exerted in this way is limited not only by the strength of the rider's legs, but by his arm strength as well. In addition, the upright position of the rider makes for a very large frontal surface area which results in quite a lot of drag. By leaning over in an attempt to cut down on the wind resistance, the rider restricts his lung capacity which decreases his ability to drive the bike. The bicycle seat causes another problem with the conventional bicycle as it is quite small and very uncomfortable.

Thirty to forty years ago a bicycle was developed in Europe that could be operated from a reclining position. The seat was larger, more comfortable, and it also supported the rider's back. The pedal cranks, instead of being positioned between the front and rear wheels as in a conventional bicycle, were positioned forward of the front wheel so that the rider would put his legs out in front of him. The handle bars were positioned under the rider's legs. Since this type of cycle is operated from a recumbent, or reclining, position it is called a recumbent bicycle. Initially, this bike proved somewhat successful in competition. It was banned, however, from racing, and the design fell out of use. The difficulty with this recumbent bicycle was that the frame had to be able to withstand a tremendous amount of force. This is because the pedal crank is positioned at the extreme end of the bicycle to enable the rider to put his legs out in front of him. When pressure is applied to the pedal, the crank acts as a moment arm to put a proportionately greater amount of force on the frame. To prevent breaking, the frame had to be quite strong and, consequently, heavy.

It is therefore an object of the present invention to provide a recumbent two wheeled bicycle of an improved design that enables it to be lighter, stronger, faster and easier to ride than prior art bicycles.

Other and further objects of the present invention, as well as the advantages attendant therewith, will become apparent when the claims and description contained herein are considered in conjunction with the attached drawings to which they relate.

SUMMARY OF THE INVENTION

The invention relates to a bicycle operated by a rider in a reclining or recumbent position. The bicycle includes a frame constructed of three parts which shall be referred to herein respectively as the rear section, the middle section, and the front section. The rear section supports the rear wheel and the back of the seat. An X member behind the seat connecting the two ends of the rear section provides further support for the back of the seat. The middle section is connected to the rear section and supports the bottom of the seat. The front wheel is supported by the lower end of a front fork assembly. The handle bars are rotatably mounted to a front fork support housing attached to the upper end of the front fork assembly such that the handle bars extend beneath the legs of the rider. The middle section and front section are connected together via the front fork support housing. The front section is reinforced by a pair of parallel crank assembly braces extending from the rear of the middle section to the forward end of the front section. A crank assembly is supported by the front section at the front end thereof. A chain extends from the crank assembly to the rear wheel to drive the cycle. Conventional caliper brakes and gear mechanism is also provided.

BRIEF DESCRIPTION OF THE DRAWING

FIG. 1 is a ¾ view of an improved recumbant bicycle showing the position of a rider on the cycle.

FIG. 2 is an isometric view of the bicycle of FIG. 1.

DETAILED DESCRIPTION

FIGS. 1 and 2 display a two wheeled pedalable land vehicle 10 operated by the rider from a reclining position. The cycle 10 comprises frame 12, seat 14 and wheels 16 and 18. Frame 12 is composed of rear section 20, middle section 22 and front section 24. Rear section 20 includes a horizontal rear fork with left tong 26 and right tong 27. Stays 28 and 29 are connected to the left and right tongs 26,27 at their most rear position. The apexes 30 and 31 of the angles formed by tong 26 and stay 28 and by tong 27 and stay 29 are adapted to support rear wheel 16 and are spaced 5 inches apart. Tongs 26, 27 and stays 28, 29 may be constructed of mild steel tubing one half of an inch outside diameter and from 0.035 inch to 0.045 inch thick. The steel tubing may be slightly smaller than this without sacrificing an unreasonable amount of strength. If an extremely light weight cycle is desired, as is the case for racing cycles, chrome alloy can be used instead of mild steel tubing. The chrome alloy tube could be much smaller, say, ⅜ of an inch outside diameter. Again, this size is subject to some alteration. The length of stays 28, 29 is 16 inches. The rear fork with tongs 26, 27 is 17 inches long.

Crossbar 32 is a tubular element four inches long welded to the top of stays 28 and 29 connecting the two stays together at their top and separating them by one and three quarters inches. Seat 14 is adjustably attached to the rear section 20 by angle plates 34 and 36. Bolts 38 and 40 and nuts 42 and 44 attach angle plates 34 and 36 to the back of seat 14. Bolt 46 extends from angle plate 34 through crossbar 32 and angle plate 36 and is fastened by washers 48 and 50 and ring nuts 52 and 54. The slotted portions 56 and 58 of angle plate 34 and 36 may be three inches long. Bolt 46 must be long enough to project out of each angle plate; a five inch bolt is satisfactory for this purpose.

Support member 60a and 60b is welded to the top of stays 28,29 and the end of tongs 26,27 to provide additional strength and support for seat 14. Seat 14 must withstand considerable pressure because of the configuration of the bicycle. When pedal crank 118 is pushed forward, a corresponding force is directed against the back of seat 14. Since the pedal cranks are pushed alternately in a continuous cycle, the left portion of the back of seat 14 and then the right portion undergoes force. This would normally cause seat 14 to twist unless it were heavy and rigid. Stays 28 and 29 undergo compression to support seat 14 when pressure is applied to the back of the seat but they provide very little resistance to twisting motion. Support member 60a and 60b prevents this twisting or tortional rotational movement of seat 14 with respect to the frame 12 by attaching the top part of stays 28 and 29 to the forward portion of tongs 26 and 27. This forms a configuration comprising two interwoven triangles. Support member 60a and 60b may be of an X configuration comprising 60a and 60b as shown and may be three eighths of an inch outside diameter mild steel tubing 0.035 inch to 0.045 inch thick.

The support member may conveniently be fabricated as a two piece tubular construction. This may take the form of a straight tube 60a connecting right stay 29 with left tong 26 and a straight tube 60b connecting left stay 28 with right tong 27 or alternatively the illustrated embodiment wherein bent tube 60a connects left stay 28 with left tong 26 and bent tube 60b *connects right stay 29 with right tong 27. In either embodiment tubes 60a and 60b are securely welded together at their midpoints.*

Seat support member 60 thus permits seat 14 to be made of a thin light weight material such as formed aluminum or glass reinforced plastic. For an even lighter cycle, the support member may be slightly smaller or, if made of chrome alloy instead of steel, may be ⅛ of an inch or less outside diameter thickness.

Plate 62 is welded to tongs 26 and 27 at end 64 to reinforce the junction of the tongs and contains ¼ inch hole 65 for mounting a standard 10 speed bike caliper brake (not shown). Tongs 26 and 27 are welded to middle section 22 on the left and right side thereof respectively. The support member tubes 60a and 60b are welded to the respective sides of middle section 22 at its rear end providing a reinforced common junction point connecting the tongs, the support member tubes and the middle section.

Middle section 22 is 12½ inches long and constructed of mild steel tubing from 1⅛ inches to ⅞ outside diameter from 0.035 inch to 0.045 inch thick. If made of chrome alloy, the tubing may be from ⅛ of an inch to ⅝ of an inch outside diameter. Slotted plate 66 contains slots 68 and 70, each 3 inches long and spaced 5½ inches apart. Tabs 72 and 74 attach plate 66 to middle section 22 of frame 12. Bolts 76 and 78 adjustably attach seat 14 to plate 66. It can be seen that the seat is adjustably attached to the rear section 20 and to middle section 22 so that the seat may be moved three inches from its back position to its most forward position.

Seat 14 is preferably a fiberglass shell within a foam cushion covering. The shell is 3/16 of an inch thick and measures 13 inches wide by 11 inches deep with a 16 inch back. This seat gives full support to the bottom and back of the rider, and yet is light in weight.

Middle section 22 is welded to front support housing 80 such that, in one embodiment, front fork support housing 80 makes an angle of 12 degrees with a vertical reference line. The precise size of this angle is not important. Housing 80 is three inches long. Front fork 82 is rotatably supported by front fork housing 80 and is connected to handle bar 84 by bolt 86. Bolt 86 extends through sleeve 88. It should be noted that seat 14 may be slightly raised from the position shown in the Figure to allow handle bar 84 to extend slightly rearward by means of an appropriately dimensioned offset bracket allowing the rider to assume a more relaxed arm position that may be preferred by some riders. Ball race 90 facilitates smooth rotation of front fork 82. Front fork 82 is 9½ inches long and contains 5/16 inch slots 94 and 96 at its ends to support the front wheel 18. A conventional brake caliper (not shown) may be mounted via mounting hole 98. The tongs of front fork 82 have an inside clearance of 2½ inches and the slots 94 and 96 of the ends of the tongs are separated by 3⅝ inches.

Foam grips 100 and conventional brake hand grips 102 may be mounted on handle bar 84. Conventional gear change apparatus may be used, including gear change lever 104.

Front section 24 is welded to front support fork housing 80 such that front section 24 makes an angle of 12.5 degrees with the middle section 22. This angle may be anywhere from 10 degrees to 20 degrees, depending upon the preferences of the rider. Front section 24 may be constructed of a mild steel tube 1⅛ inches outside diameter from 0.035 inches to 0.045 inches thick and 23 inches long. The mild steel tubing can be as small as ⅞ of an inch outside diameter for a lighter weight cycle. In the racing version chrome alloy may be used which measures from ⅛ of an inch to ⅝ of an inch outside diameter. The front section may be made longer for taller riders, say 24 inches long or shorter for shorter riders, say, 22 inches long. Obviously the crank assembly braces should be stronger if a significantly longer front section is employed.

Chain guard 106 protects the rider and his clothes from becoming entangled in chain 107. The guard 106 is 23 inches long and two inches wide along its top surface. The side surface is two inches high at end 108, this surface narrows gradually until point 110 and then more rapidly until it reaches end 112. Guard 106 is attached to frame 12 via tabs 114 and 116. Tab 116 is two inches high and positioned about 9¼ inches from the center of crank 118. Chain idler wheel 120 is positioned about ⅞ of an inch from front section tube 24 and about 20 inches from the center of the crank assembly 128 on the tall men's version.

Crank assembly braces 122 and 124 are welded to middle section 22 at the junction of the middle section with the rear section and to the front section at the top of the crank housing. Tong 26, support member 60a and crank assembly brace 122 meet and are welded together at a common junction on the left side of the frame. Tong 27, support member 60b and crank assembly brace 124 meet and are welded together at a common junction on the right side of the frame. The joining of all these various members to one another further adds strength and rigidity to the network of tubes comprising the frame.

Each one of the crank assembly braces 122a and 122b extending from the front fork support housing 80 to the crank housing 126 preferably is of integral construction with the respective one of the crank assembly braces 122 and 124 extending from the rear of the middle section to the front fork support housing. In any event the crank assembly braces are firmly welded to the front fork support housing near its top.

The braces are mild steel tubes ⅝ of an inch outside diameter and from 0.035 to 0.045 inch thick. These braces may be slightly smaller for a lighter weight bicycle.

The conventional crank assembly 128 consists of a crank housing 126 rotatably supporting pedal cranks 118. Pedal cranks 118 are connected together by a crank support rod (not shown). Ball bearings (not shown) surround the crank support rod inside crank housing 126. Ball bearing shield 130 and an identical shield (not shown) on the other side of the crank housing 126 keep dust and dirt from the ball bearings. Although a standard ten speed bicycle crank assembly is satisfactory, the cranks 118 may be considerably longer than standard cranks to provide a longer moment arm. This is possible since the end of the frame section 24 is 15 inches from the ground providing more clearance than a conventional bicycle. Of course, the longer the cranks are, the stronger the frame must be to withstand the additional leverage. The crank assembly braces discussed above enable a light frame to be used in conjunction with long pedal cranks. This is a particularly desirable combination for a high speed touring bicycle. Conventional cranks are 6 to 7 inches long; cranks 10 to 12 inches long have been used with success on a bicycle having the improvements described herein.

Crank assembly 128 may include conventional 10 speed bicycle gearing comprising two front sprockets (not shown) and a conventional derailer sprocket changer (not shown).

In order to operate the invention, the rider sits in seat 14 and places his feet on pedal cranks 118. Handle bar 84 extends beneath the rider's legs. The rider sits less than two feet from the ground. It can be seen that the rider can place both of his feet on the ground at the same time when stopped. The lower cycle also has a lower center of gravity which makes it more stable than a regular bicycle. Another advantage of the recumbent cycle is that since the handle bars are under the rider's legs there are no obstructions covering the rider in case of emergency. It can also be seen that the rider can literally put his back into his stroke to deliver more force to the cranks than is possible with the conventional bicycle, wherein the rider must pull on the handle bars to deliver force to the cranks. It is to be understood that these specific descriptions of the invention and the embodiment thereof contained herein are illustrative only, and that the actual invention is not so limited. Changes in the illustrated features of the invention, which are readily apparent to those skilled in the art in light of the above teachings and are within the scope and spirit of the appended claims are intended to be included therein.

What is new and desired to be secured by letters patent of the United States, is:

What is claimed is:

1. In a bicycle adapted to be propelled by a recumbent rider, including an elongated frame having a front portion and a rear portion, a front wheel rotatably mounted on the frame, a rear wheel rotatably mounted the rear portion of the frame, a crank assembly including crank pedals supported on the front portion of said frame, a front fork support housing secured to the frame intermdiate said front and rear portions and rotatably supporting said front wheel, and a seat supported on said frame generally intermediate said wheels, the improvement comprising:

a support member connecting the back of said seat with the rear portion of said frame for reinforcing the rear portion of said frame and for resisting torsional rotational movement of said seat relative to said frame through pressures against said seat back as said bicycle is driven by force being applied alternately to said pedal cranks, said rear portion of said frame comprising a fork including substantially horizontal left and right tongs, said left and right tongs supporting said rear wheel; said fork further including left and right stays connected to the rear of said left and right tongs respectively, and extending upwardly and forwardly toward the back of said seat;

and said support member comprises an X member diagonally connecting said left stay with said right tong of said rear fork and diagonally connecting said right stay with said left tong of said rear fork, and means connecting said X member to the back of said seat.

2. The improvement of claim 1 further comprising:

a pair of crank assembly braces essentially parallel to said front portion of said frame connected to said crank housing and to said frame at a point behind said front fork support housing for reinforcing said frame.

3. The improvement of claim 2 wherein said crank assembly braces additionally are connected to said front fork support housing for further reinforcing said frame.

4. The improvement of claim 3 wherein each of said pair of crank assembly braces comprises:

a first part connected to said crank housing and to said front fork support housing and a second part connected to said front fork support housing and to said frame at a point behind said front fork support housing; each of said first part connected to each of said second part by way of said front fork support housing.

5. The improvement of claim 2 wherein said forward portion of said frame is a generally tubular section having a first longitudinal axis; said frame also comprising a generally tubular middle portion having a second longitudinal axis intersecting with said first longitudinal axis;

said forward portion being rigidly connected to the front of said middle portion and depending slightly downwardly therefrom such that the angle formed by the intersection of said first axis with said second axis is between 10° and 20°; and an idler gear positioned on said frame in the vicinity of the junction of said front portion and said middle portion for maintaining a chain in essentially parallel alignment with the portions of said frame proximate thereto.

6. The improvement of claim 1 wherein said conncting means comprises a cross bar connected to the upper ends of said member;

two slotted angle plates fastened to the back of said seat;

means associated with and extending through said cross bar and through said slotted angle plates for adjustably fixing said cross bar at various positions relative to said angle plates, whereby said seat is adjustably and rigidly mounted to said frame.

7. The improvement of claim 1 wherein said pedal cranks are 10 to 12 inches long.

8. A bicycle adapted to be propelled by a recumbent rider comprising:

a front wheel, a rear wheel, a frame, a seat, and a crank assembly wherein said frame comprises:

(A) a rear section composed of a fork including substantially horizontal left and right tongs diverging rearwardly from a common junction and adapted for supporting said rear wheel;

left and right stays connected to the respective rear ends of said left and right tongs, and extending upwardly and forwardly toward said seat;

a cross bar connecting together said left and right stays at their most forward ends and attaching said left and right stays to the back of said seat;

a plate attached to and strengthening said rear fork at the junction of said left and right tongs;

a support member connecting the respective forward ends of said stays to said rear fork at a point near the junction of said left and right tongs;

(B) a middle section rigidly connected to said rear section, said middle section supporting said seat;

a front fork support housing rigidly connected to said middle section;

(C) a forward section rigidly connected to said front fork support housing;

a crank assembly supported by said forward section at one end thereof;

a front fork rotatably mounted on said front fork support housing, said front fork supporting said front wheel;

a pair of parallel crank assembly braces connected both to said crank housing and to said frame at a point behind said front fork support housing for reinforcing said frame; said crank assembly braces additionally connected to said front fork support housing for further reinforcing said frame;

a handle bar rigidly connected to said front fork and rotatable therewith with respect to said front fork support housing; and drive means connecting said crank assembly with said rear wheel for rotating said rear wheel, said support member being an X member diagonally connecting said left stay with said right tong of said rear fork and diagonally connecting said right stay with said left tong of said rear fork.

9. A bicycle as in claim 8 wherein said forward section is generally tubular and has a first longitudinal axis;

said middle section is generally tubular and has a second longitudinal axis intersecting with said first longitudinal axis; and said forward section is rigidly connected to the front of said middle section and depends slightly downward therefrom such that the angle formed by the intersection of said first axis with said second axis is between 10° and 20°.

10. A vehicle as in claim 8, wherein the middle section is made of chrome alloy tubing from $\frac{7}{8}$ to $1\frac{1}{8}$ inches in diameter.

11. A vehicle as in claim 10, wherein said forward section is 20 to 24 inches long and made of chrome alloy from $\frac{7}{8}$ to $1\frac{1}{8}$ inches in diameter and from 0.020 to 0.030 inches thick.

12. A vehicle as in claim 8, wherein the middle section is made of mild steel tubing from $\frac{3}{4}$ to $1\frac{1}{8}$ inches in diameter.

13. A vehicle as in claim 12, wherein said forward section is 20 to 24 inches long, from $\frac{7}{8}$ to $1\frac{1}{8}$ inches in diameter and made of mild steel tube from 0.035 to 0.045 inches thick.

14. A vehicle as in claim 8, wherein said crank assembly braces are constructed of mild steel tube at least $\frac{3}{8}$ inch in diameter and from 0.035 inch to 0.045 inch thick, said braces being attached to said front fork support housing near the top portion thereof.

15. A vehicle as in claim 8, wherein said crank assembly braces are constructed of chrome alloy at least $\frac{3}{8}$ of an inch in diameter and from 0.020 inch to 0.030 inch thick.

16. A vehicle as in claim 8, including adjustment means on said seat for positioning said seat a plurality of distances from said crank assembly.

17. A vehicle as in claim 16, wherein said adjustment means comprises:

two slotted angle plates fastened to the back of said seat;

means associated with and extending through said cross bar and through said slotted angle plates for adjustably fixing said cross bar at various positions relative to said angle plates;

a slotted base plate rigidly attached to said middle section of said frame;

means associated with and extending from the bottom of said seat through said slotted plate for adjustably fixing said seat at various positions relative to said slotted plate.

18. A vehicle as in claim 8, wherein said crank assembly includes cranks 10 to 12 inches long.

19. A vehicle as in claim 8, including a chain guard extending forwardly from said front fork support housing, wherein said drive means comprises: A chain connecting said crank assembly to said rear wheel; an idler gear for supporting said chain in the vicinity of said front fork support housing; a conventional derailer apparatus; a conventional plurality of gears; cable guides along said frame; and a cable lever control for selecting one of said gears.

20. A vehicle as in claim 8, wherein said seat comprises a light weight fiberglass bucket shell.

21. A vehicle as in claim 20, wherein said fiberglass bucket shell measures no more than 3/16 of an inch thick, no more than 13 inches wide, no more than 11 inches deep and no more than 16 inches high at the back.

22. A bicycle adapted to be propelled by a recumbent rider comprising:

(a) a front wheel;
(b) a rear wheel;
(c) a seat comprising:
  (1) a light weight reinforced plastic bucket shell of no more than 3/16 of an inch thick, no more than 13 inches wide, no more than 11 inches deep, and no more than 16 inches high at the back;
(d) a frame comprising:
  (1) a rear fork comprising:
    (i) substantially horizontal left and right tongs diverging rearwardly from a common junction and adapted for supporting said rear wheel at the rear ends thereof;
    (ii) left and right stays connected to the respective rear ends of said left and right tongs, and extending upwardly and forwardly toward said seat;
    (iii) a cross-bar connecting together said left and right stays at their respective forward ends and attaching said left and right stays to the back of said seat;
    (iv) a plate attached to and strengthening said rear fork at the junction of said left and right tongs;

(v) a support member connecting the respective forward ends of said stays to said rear fork at a point near the junction of said left and right tongs, said support member being an X member diagonally connecting said left stay with said right tong and diagonally connecting said right stay with said left tong, and said support member being formed from steel tubing at least ⅜ inch in diameter and from 0.035 to 0.045 inches thick;

(2) a middle frame section formed of steel tubing from ⅞ to 1⅛ inches in diameter rigidly connected to the forward end of said rear fork, said middle section adapted for supporting said seat;

(3) a front fork support housing rigidly attached to said middle section at the forward end thereof;

(4) a forward frame section rigidly attached to said front fork support housing and extending forwardly therefrom, said forward section being formed from steel tubing from 0.035 to 0.045 inches thick, from ⅞ to 1⅛ inches in diameter, and from 20 to 24 inches long;

(5) a crank housing, rigidly attached at the forward end of said forward frame section;

(6) a pair of parallel crank assembly braces each connected both to said crank housing and to said frame at a point behind said front fork support housing for reinforcing said frame, said braces additionally connected to said front fork support housing for further reinforcing said frame, said crank assembly braces being formed from steel tubing at least ⅜ inch in diameter and from 0.035 to 0.045 inches thick;

(e) a crank assembly rotatably mounted in said crank housing; said crank assembly including cranks 10 to 12 inches long;

(f) a front fork rotatably mounted on said front fork support housing, said front fork supporting said front wheel;

(g) a handle bar rigidly connected to said front fork and rotatable therewith with respect to said front fork support housing;

(h) a chain for transmitting propulsion for use from said crank assembly to said rear wheel;

(i) an idler gear for supporting said chain in the vicinity of said front fork support housing;

(j) a chain guard extending forwardly from said front fork support housing; and (k) adjustment means operatively associated with said seat for positioning said seat at various distances from said crank assembly, said adjustment means comprising:

(1) two slotted angle plates fastened to the back of said seat;

(2) means associated with and extending through said cross bar and through said slotted angle plates for adjustably fixing said cross bar at various positions relative to said angle plates;

(3) a slotted base plate rigidly attached to said middle section of said frame;

(4) means associated with and extending from the bottom of said seat through said slotted plate for adjustably fixing said seat at various positions relative to said slotted base plate.

* * * * *